United States Patent
Ho et al.

(10) Patent No.: US 6,709,748 B1
(45) Date of Patent: Mar. 23, 2004

(54) FLEXIBLE POLYURETHANE MATERIAL

(75) Inventors: Chia-Tie Ho, Woodbury, MN (US); Clarence Fullbright, Jr., Brooklyn Park, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/710,036

(22) Filed: Nov. 10, 2000

Related U.S. Application Data

(62) Division of application No. 09/064,490, filed on Apr. 22, 1998, now Pat. No. 6,258,918.

(51) Int. Cl.[7] ............................................. B32B 27/40
(52) U.S. Cl. ................... 428/423.1; 528/58; 528/65; 528/66; 528/76; 528/80; 528/83; 528/84; 528/85
(58) Field of Search ................ 428/423.1; 528/58, 528/65, 66, 76, 80, 83, 84, 85

(56) References Cited

U.S. PATENT DOCUMENTS

| | | |
|---|---|---|
| 3,546,148 A | 12/1970 | Diamond et al. |
| 3,583,945 A | 6/1971 | Robins |
| 3,592,787 A | 7/1971 | Robins |
| 3,704,023 A | 11/1972 | Downs |
| 3,805,532 A | 4/1974 | Kistner |
| 3,915,050 A | 10/1975 | Kurhajec |
| 4,087,412 A | 5/1978 | Groves |
| 4,100,010 A | 7/1978 | Waugh |
| 4,530,859 A | 7/1985 | Grunzinger, Jr. ............. 427/385 |
| 4,556,600 A | 12/1985 | Kraemling et al. |
| 4,576,850 A | 3/1986 | Martens |
| 4,663,213 A | 5/1987 | Bailey et al. ............... 428/204 |
| 4,808,471 A | 2/1989 | Grunzinger ................. 428/325 |
| 4,839,455 A | 6/1989 | Fong ............................ 528/28 |
| 5,117,304 A | 5/1992 | Huang et al. ............... 359/529 |
| 5,124,210 A | 6/1992 | Fong ........................... 428/425 |
| 5,127,973 A | 7/1992 | Sengupta et al. ............. 156/60 |
| 5,338,595 A | 8/1994 | Li ................................ 428/143 |
| 5,462,768 A | 10/1995 | Adkins et al. ............... 427/265 |
| 5,502,147 A | 3/1996 | Nodelman et al. |
| 5,508,337 A | 4/1996 | Wamprecht et al. |
| 5,587,448 A | 12/1996 | Engen ........................ 528/55 |
| 5,656,713 A | 8/1997 | Sarpeshkar et al. |

FOREIGN PATENT DOCUMENTS

| | | |
|---|---|---|
| CA | 767695 | 4/1967 |
| DE | 197 09 467 C1 | 10/1998 |
| EP | 068632 B1 | 5/1982 |
| EP | 0 083 017 | 12/1982 |
| EP | 087262 A1 | 2/1983 |
| EP | 082618 B1 | 5/1986 |
| EP | 0230364 A3 | 1/1987 |
| EP | 0392847 | 4/1990 |
| GB | 1053383 | 6/1962 |
| GB | 1323312 | 7/1970 |
| GB | 1317991 | 5/1973 |
| GB | 2104086 | 4/1979 |
| WO | WO 92/22619 | 12/1992 |
| WO | WO 93/10167 | 5/1993 |
| WO | WO 96/00754 | 1/1996 |

OTHER PUBLICATIONS

U.S. patent application Ser. No. 09/064,490, filed Apr. 22, 1998, by Chia–Tie Ho and Clarence Fullbright, Jr.

*Primary Examiner*—John M. Cooney, Jr.
(74) *Attorney, Agent, or Firm*—Jean A. Lown; Harold C. Knecht, III; Brian E. Szymanski

(57) ABSTRACT

The present invention provides a flexible two component polyurethane and method for producing the polyurethane. The cured polyurethane is flexible, durable and weather resistant. The polyurethane is suitable for use as a protective layer on various substrates. The flexible polyurethane is the reaction product of solvent-free reaction components. The first component includes one or more polyols, optionally, one or more diols, and a catalyst. The second component includes a primary aliphatic isocyante crosslinker.

34 Claims, 1 Drawing Sheet

FLEXIBLE POLYURETHANE MATERIAL

This is a divisional of application Ser. No. 09/064,490, filed Apr. 22, 1998 which is now U.S. Pat. No. 6,258,918.

FIELD OF THE INVENTION

This invention relates to a flexible, polyurethane material, more particularly, to a solvent free, two-component polyurethane and, even more particularly, to such a polyurethane which is transparent and exhibits improved flexibility, durability and weathering characteristics. The present invention also includes an article utilizing the polyurethane as a top coat, and a method of making such a polyurethane top coat.

BACKGROUND OF THE INVENTION

Decorative articles often utilize a polyurethane top coat to cover or protect a base substrate and any indicia or decorative features located on the substrate. The articles may include various substrates upon which printing or profiled graphics have been applied. The polyurethane material is generally clear or optically transparent and functions as a lens in order to display the substrate or any indicia applied thereon. The decorative articles have a wide variety of uses in both interior and exterior applications. For example, model names for automobiles are often displayed in a decorative manner on an exterior surface of the vehicle. The polyurethane covers and protects the indicia displayed on the model nameplate.

Polyurethanes are generally applied onto articles or substrates as a solution or flowable reaction mass which is then cured to form a lens. The flow characteristics of the uncured polyurethane are important in developing a polyurethane coating at a sufficient and desired thickness upon curing.

Some polyurethanes, upon curing, are rigid, non-flexible polymers. The rigidity of the article is often due to the chemical structure of the components used in the formulation of the polyurethane. Rigid polyurethanes are susceptible to abrasion and scratching. Additionally, the materials do not demonstrate an appropriate level of self-healing. Self-healing describes the ability of the polyurethane to return to its original shape or appearance after being deformed, such as by scratching.

Polyurethanes are applied onto various types of substrates. However, some specific substrates are not suitable for use with conventional polyurethanes. Some substrates are susceptible to absorbing an amount of moisture which can react with the polyurethane to form bubbles in the cured polyurethane. The formation of bubbles in the polyurethane is termed outgassing. For polyurethanes containing an isocyanate, outgassing may also occur when certain porous substrates, for example polyvinyl chloride, are backed with adhesives containing carboxyl groups. The porous substrate permits the reaction of the isocyanate in the polyurethane with carboxyl groups in the adhesive. This reaction results in the release of carbon dioxide which generally becomes trapped in the polyurethane. The occurrence of outgassing in a cured polyurethane is aesthetically undesirable.

Conventional two-component polyurethanes are typically either solvent based or utilize polyethers as the primary hydroxyl source. The solvent based polyurethanes are generally not viscous enough to provide a desired thickness to the polyurethane lens. Additionally, solvent based polyurethanes, when applied as top coats, do not permit the complete evaporation of the solvent from the polyurethane. The incomplete evaporation can produce striations, parting lines, or bubbles in the polyurethane and therefore result in an aesthetically unacceptable top coat. Polyether based polyurethane mixtures can provide suitable flexible properties. However, they tend to degrade and yellow when exposed to sunlight. Thus, existing polythane compositions, and methods for producing them, often result in undesirable finished properties or are unsuitable for exterior applications.

There is a need to provide a polyurethane that is flexible, durable, and weather resistant. Additionally, such a polyurethane should be applicable to various substrates without experiencing a substantial amount of outgassing. A polyurethane having the noted properties would be suitable for use a protective coating on various substrates for both interior and/or exterior applications.

SUMMARY OF THE INVENTION

The present invention provides a two component polyurethane, an article utilizing the polyurethane, and a method of making the polyurethane. The cured polyurethane is flexible, durable and weather resistant. The optically transparent polyurethane is suitable for use as a protective coating on various substrates.

The polyurethane of the present invention has primary aliphatic isocyanate crosslinking. The polyurethane is the reaction product of two reaction components. The first reaction component includes one or more polyols. The polyol portion of the first component has an equivalent weight in the range from about 28 to about 3000. The first component also includes one or more diols having an equivalent weight in the range from about 30 to about 4000. The desired diol is a combination of a short chain diol, having an equivalent weight in the range from about 30 to about 400, and a polymeric diol, having an equivalent weight in the range from about 400 to about 4000. Polyol and diol compounds suitable for use in the first component may include polyesters, polycarbonates, polyacrylates, polyalkylenes, and polyethers, or combinations thereof. Additionally, a catalyst is included in the first component.

The second component includes a primary aliphatic polyisocyanate crosslinker. The noted polyisocyanate preferably represents at least about 50 weight percent of the total isocyanate present in the second component. The first and second components are combined to form a solvent-free admixture which may then be applied onto a desired substrate and cured. The viscosity of the admixture is generally in the range of about 400 cps to about 5000 cps at 25° C. The viscosity of the material enables the formation of a lens, or meniscus, over the substrate.

The cured, optically transparent polyurethane is flexible, durable and weather resistant. The flexibility of the polyurethane is demonstrated through the Shore A hardness test, the flexural modulus test, and the storage modulus test. The polyurethane has a Shore hardness of less than 94, a storage modulus of $1.0 \times 10^8$ pascals or less, and a flexural modulus of $1.0 \times 10^8$ pascals or less.

The durability and weather resistant properties of the present invention are demonstrated through such tests as the Hoffman scratch resistance test and the heat aging test. The polyurethane of the present invention has a surface with a Hoffmnan scratch-hardness test result of 2 or less. Additionally, the polyurethane exhibits a color shift value of 1 or less when subjected to the heat aging test.

It would be an advantage to provide a polyurethane that is flexible, durable, and weather resistant. A polyurethane having the noted properties would be suitable for use as a protective layer for both interior and exterior applications.

It would be a further advantage to provide a polyurethane that prevents outgassing when applied onto a substrate. The ability to prevent outgassing would enable the use of the polyurethane on a variety of substrates and decorative articles.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF PREFERRED EMBODIMENTS

Figure 1:
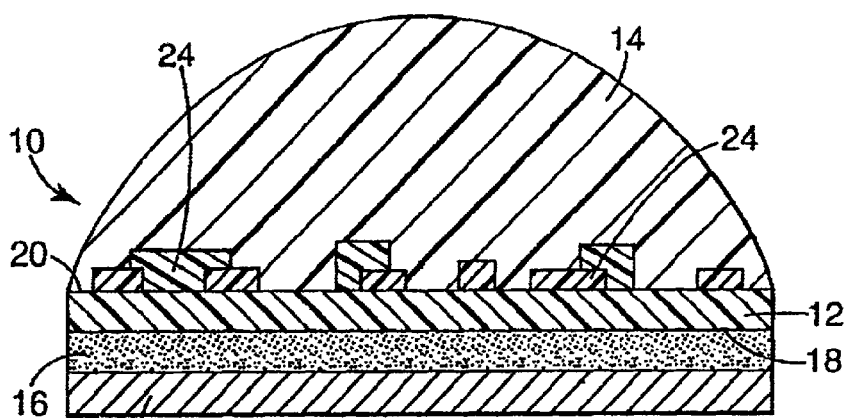
FIG. 1 is a cross-sectional view of an article formed utilizing the polyurethane of the present invention.

The preferred polyurethane of the present invention has primary aliphatic isocyanate crosslinking. The polyurethane is the reaction product of a two component system. The resulting reaction mass of the two components is generally solvent-free. In accordance with the invention, solvent free means that the reaction mass contains an amount of water or organic solvents at levels that do not adversely affect the viscosity of the reaction mass and thereby prevent the formation of a lens. Additionally, the amount of water or organic solvent must sufficiently evaporate upon curing in order to prevent the formation of striations, parting lines, or bubbles in the cured polyurethane. Preferably, solvent-free means there is less than about five weight percent water or organic solvents in the combined admixture of the reaction components. More preferably, the solvent content in the combined reaction components is less than about one weight percent.

The first reaction component contains one or more polyols, optionally, one or more diols, and a catalyst. The polyols utilized in accordance with the present invention are compounds having 3 or more hydroxyl groups. The polyols are generally selected from the group consisting of polyesters, polycarbonates, polyacrylates, polyalkylenes, and polyethers, or combinations thereof. The polyol, or combined polyols, have an equivalent weight in the range of about 28 to about 3000. In the present invention, equivalent weight corresponds to the molecular weight of the material divided by the number of hydroxyl groups. Combinations of polyols within the noted equivalent weight limitation may be suitable for use with the invention. However, the amount of polyether in the first reaction component, whether provided as a polyol or diol, preferably should not exceed about 40 weight percent of the first component. Amounts of polyethers in excess of the noted limitation can adversely affect the clarity or the weathering properties of the present invention. Desirably, polyester based polyols and diols, forming greater than about 20 weight percent polyester in the first reaction component, are used in the present invention in order to improve outdoor durability. The polyol comprises in the range from greater than about 10 weight percent of the first reaction component.

Optionally, one or more diols are included in the first reaction component. The diols are compounds that have two hydroxyl groups. In addition to polyester diols, polycarbonate, polyacrylate, polyalkylene, and polyether diols, or combinations of the noted compounds, may be utilized in the present invention. The one or more diols have a combined equivalent weight in the range of about 30 to about 4000. Additionally, the diols comprise in the range up to about 65 weight percent of the first reaction component. Desirably, the diols include the combination of a short chain diol, having an equivalent weight in the range from about 30 to about 400, and a polymeric, or long chain diol having an equivalent weight in the range of from about 400 to about 4000. Additionally, it has been found that when a polyester and a polyether are utilized in the first reaction component, the combined amount of polyether, whether provided as a polyol or diol, preferably should not exceed about 40 weight percent of the first reaction component.

The first reaction component of the present invention also requires a catalyst. The isocyanate groups of the second component react with the hydroxyl groups of the first component under the influence of the catalyst to form urethane linkages. Conventional catalysts generally recognized for use in the polymerization of urethanes may be suitable for use with the present invention. For example, aluminum, bismuth, tin, vanadium, zinc, or zirconium based catalysts may be used with the present invention. Though not desired because of the their potential toxicity, mercury based catalyst may also be used. The desired catalysts are tin based catalyst. Tin based catalyst have been found to significantly reduce the amount of outgassing present in the polyurethane. Most desirable are dibutyl tin compounds. Even more desirable are the catalyst selected from the group consisting of dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. The catalyst is preferably included at levels of at least 200 ppm in the first component and more preferably at 300 ppm or greater.

Optionally, the first reaction component of the present invention can include various additives. For example, leveling agents may be utilized in the first reaction component to ensure a smooth finish to the exposed surface of the polyurethane. A polyethylene oxide modified polymethyl siloxane can be utilized in the present invention as a leveling agent. However, other leveling agents generally recognized by one of ordinary skill in the art may also be suitable for use with the invention. The leveling agents are desirably included in the range from about 0.01 weight percent to about 1 weight percent.

Another additive to the first component can include UV absorbers which improve the weather resistance of the polyurethane top coal. The UV absorbers generally recognized in the art may be suitable for use with the invention. Alternatively, a hindered amine radical scavenger can be included in the first reaction component or combined with an UV absorber. The hindered amine free radical scavengers generally recognized in the art contribute to photostabilization of the polyurethane by trapping alkoxy and hydroxy radicals produced by light-induced dissociation of hydroperoxides. The amount of UV absorber in the first component is desirably in the range from about 0.1 weight percent to about 4 weight percent. The amount of hindered amine radical scavenger in the first component in desirably in the range of about 0.1 weight percent to about 2 weight percent.

Additionally, moisture scavengers, antioxidants, and antifoaming agents can be included with the first reaction component. Conventional compounds of the noted categories generally recognized by those skilled in the art may be suitable for use in the present invention to improve the finished properties of the polyurethane. Moisture scavengers are desirably included at levels in the range of about 0.1 weight percent to about 3 weight percent. The antioxidant is desirably included in a range of about 0.1 weight percent to about 2 weight percent. Antifoaming agents are desirably included in an amount from about 0.2 weight percent or less.

Other compounds, such as coloring agents and decorative solids, can be added to the first component to enhance to the aesthetics of the finished polyurethane. Coloring agents, such as pigments or dyes, are included at various levels to obtain a desired effect. Decorative solids could include such items as metal flakes, polymeric flakes, glitter, beads, or other materials that provide a decorative feature to the finished polyurethane. The decorative solids are also included in various amounts to obtain a desired effect to the finished article.

In accordance with the present invention, a second component is provided which includes a primary aliphatic isocyanate crosslinker, and preferably a primary aliphatic polyisocyanate crosslinker. A primary isocyanate is defined as one having a carbon atom that has an —NCO group and two hydrogen atoms attached to the carbon atom. The primary isocyanate is an important factor in providing a flexible polyurethane that does not exhibit a substantial amount of outgassing. Outgassing can occur when the isocyanate component of the polyurethan undesirably reacts with a source of water or carboxyl groups and not the hydroxyl groups present in the first component.

In the present invention, it is preferred that the second reaction component include a primary polyisocyanate in an amount of about 50 weight percent or greater. This generally corresponds to polyisocyanate crosslinking of about 25 weight percent or greater in the cured polyurethane. The primary aliphatic polyisocyanate may be the only isocyanate source in the component or it may be combined with other primary aliphatic isocyanates, such as monomeric isocyanates. The utilization of secondary isocyanates can result in the rigid polyurethanes or polyurethanes which exhibit outgassing. Conventional primary aliphatic polyisocyanate crosslinkers may be suitable for use with the present invention. For example, Desmodur XP-7100 and Desmodur N-3300 from Bayer Chemical of Pittsburgh, Pa. are two polyisocyanates suitable for use with the invention. Additionally, the polyisocyanate may be a blocked polyisocyanate to further enhance the reduction of outgassing in the cured polyurethane. Blocked polyisocyanates will not react until a desired curing temperature is achieved, thereby further preventing the undesired reaction of the isocyanate with water or carboxyl groups. Polyisocyanate levels of at least about 50 weight percent of the total isocyanate present in the second component may substantially reduce outgassing in the cured polyurethane.

The crosslink density of a polyurethane is calculated by dividing the weight of the reaction components having a functionality of three or greater by the total weight of the polyurethane and multiplying by 100. Generally, rigid polyurethanes have relatively high cross link densities of 30% or higher. In accordance with the present invention, the use of a primary aliphatic polyisocyanate results in a flexible polyurethanes having a high crosslink density. When the polyisocyanate content of the second reaction component is about 50 weight percent or greater, crosslink densities are 30 percent or greater, and preferably 40 percent or greater. The flexibility of the resulting urethanes, according to the flexural modulus tests are generally $1.0 \times 10^8$ or less.

The first and second reaction components are combined to form a solvent-free admixture having an NCO:OH ratio of about 0.75 to about 1.25. The reaction components, prior to mixing, are desirably maintained at specified viscosity ranges. The viscosity measurements for the present invention were measured on a Brookfield Viscometer model RV with spindle number 4 at about 20 rpm. The viscosity of the first component is desirably maintained in the range from about 200 cps to about 5000 cps at 25° C. The viscosity of the second reaction component is desirably maintained in the range from about 100 cps to about 5000 cps at 25 C. Upon mixing, the viscosity of the admixture is in the range from about 400 cps to about 5000 cps at 25° C., and desirably in the range from about 600 cps to about 4000 cps.

The viscosity of the uncured polyurethane is important in achieving a desired thickness and continuity in the cured polyurethane lens when applied over a substrate. The viscosity limitation also provides a pourable reaction mass that flows well onto a substrate. It is desired that the reaction mass flow to the edge of the substrate and form a radius of curvature, without actually overflowing the substrate. The viscosity limitation also enhances the ability to achieve desired layer thicknesses. A higher viscosity than the noted limitation may result in striations or parting lines in the finished polyurethane. A lower viscosity will not permit the polyurethane to form the desired meniscus or lens over the substrate. The polyurethane of the present invention is capable of achieving thicknesses of greater than 0.13 mm, and preferably greater than 0.25 mm.

In accordance with the present invention, the admixture is applied onto a substrate and cured to form a polyurethane coating. The curing of the polymer may be accomplished by heating the material, applying infrared radiation, or curing at ambient temperatures. Other conventional curing techniques recognized by those skilled in the art may be suitable for use with the present invention. Desirably, the polyurethane is cured in a convection oven at 52° C. for about 10 hours. One advantage of the present invention over conventional polyurethane s is that the polyurethane is tack free after about one hour of curing at about 52° C. The tack free polyurethane can then be handled without being completely cured.

Upon curing, the polyurethane of the present invention exhibits desired flexbility, durability, and weather resistant properties. Preferably, the polyether segments, resulting from the use of polyether based polyols and diols in the first component, represent no more than 20 weight percent in the cured polyurethane. More preferably, the polyether segments in the cured polyurethane is about 15 weight percent or less. A polyether content in excess of the noted limitation may adversely impact the clarity and weathering properties of the cured polyurethane.

The flexibility of the present invention enables use of the polyurethane on various articles. For example, the present invention may be utilize as a protective layer on an adhesive backed substrate. The flexibility of the polyurethane of the present invention enables the application of the coated article on curved or non-planer surfaces. The flexibility significantly reduces the tendency of the polyurethane to spring back to its originally cured form after being bonded to a surface.

The flexibility of the polyurethane is demonstrated by the Shore A hardness properties, the storage modulus, and the flexural modulus. The Shore A hardness test of the present inventive polyurethane is generally less than 94, and preferably less than 92. Shore A hardness levels in excess of 94 are considered stiff or rigid. The storage modulus indicates the rigidity of the polyurethane under tension. The polyurethanes of the present invention have a storage modulus of $1.0 \times 10^8$ or less. The flexural modulus measures the flexibility of the polyurethane under tortional strain. The polyurethanes of the present invention have a flexural modulus of $1.0 \times 10^8$ or less. Additionally, the flexibility of the polyurethane is often indicated by its self-healing characteristics, or the ability to return to its original shape upon deformation.

The durability and weathering properties of the present invention are important features which enable the use of the polyurethane in various environments. For applications of the polyurethane in exterior environments, the polyurethane must not yellow or significantly change color when exposed to environmental conditions. The present invention, when subjected to a heat aging test in accordance with ASTM D2244-79, exhibits a color shift within 1 delta E. Other environmental tests utilized to indicate acceptable exterior performance are the salt spray test, the humidity resistance test, and the thermal shock test. A polyurethane should remain clear and not cloudy or opaque upon completion of the noted tests. The durability of the polyurethane top coat is measured by the Hoffman scratch resistance test which indicates the abrasion resistance of the material. The present invention generally has a Hoffman scratch resistance of 2 or less.

The polyurethane of the present invention may be applied to various substrates to form a layer on the substrate, or a portion of the substrate. The substrate may include wood, polymeric material, fiber reinforced polymers, metal, or combinations thereof. The choice of substrate is dependent upon the desired end use. Some examples of combined substances would include metal coated polymer films and polymer sealed wood or wood veneer. The polyurethane of the present invention is ideally suited for applications with substrates containing moisture or applications permitting the direct or indirect contact of the isocyanate with carboxyl groups. For example, a porous substrate with an adhesive backing permits the indirect contact of the isocyanate in the polyurethane reaction mass with carboxyl groups in the adhesive.

The polyurethane of the present invention is ideally suited for use in forming decorative articles requiring a transparent layer. Some decorative articles utilize a substrate with indicia applied onto the substrate. Indicia includes any distinctive marks or representations. In accordance with the present invention, the polyurethane may be applied directly onto the substrate and the indicia.

In the present invention, indicia could include such items as printed graphics or three-dimensional graphics. Printed indicia may be applied onto the substrate, for example, with solvent based inks, water-based inks, UV inks, or powder inks. The printed indicia may be applied through various processes including screen printing, flexo-printing, gravure printing, digital printing, off-set printing, and pad printing. Three dimensional graphics may also be applied onto the substrate or may, by themselves, serve as the substrate. Three dimensional graphics may include for example, a cured polyurethane body with a tie layer bonded to the polyurethane. An adhesive is then applied to the opposing surface of the tie layer. An example of three-dimensional graphics would include those disclosed in EP 0392847, herein incorporated by reference. Other types and styles of indicia may also be utilized with the present invention.

Alternatively, the article may include several different types or styles of indicia applied, or layered upon the substrate. The polyurethane of the present invention is well suited for this style of application because it does not permit a substantial amount of outgassing. This layered style of indicia can directly expose an adhesive to the urethane top coat. This type of application with a conventional polyurethane often results in a significant amount of outgassing in the cured polyurethane. The present invention does not experience a substantial amount of outgassing, thereby enabling the direct exposure of the adhesive to the polyurethane.

FIG. 1 illustrates an article made in accordance with the present invention. The article 10 includes a polymeric base substrate 12 upon which the polyurethane top coat 14 of the present invention is applied. The polymeric base substrate 12 could desirably include polyvinyl chloride, polyester, acrylic polymers, polycarbonates, polyurethanes, polyethylene acrylic acid copolymer, polyvinylacetates, and reflective sheeting. An adhesive 16 may be attached to a surface 18 of the substrate 12 opposite the surface 20 upon which the polyurethane 14 is applied. The adhesive may include various adhesive attachment systems, for example, pressure sensitive adhesives, contact adhesives, hot melt adhesives, and structural adhesives. A release liner 22 is attached to the adhesive 16 until removed upon final application of the article 10 to a desired surface (not shown). The substrate 12 includes indicia 24 applied onto surface 20 of the substrate 12. The indicia 24 is covered by the polyurethane top coat 14.

Figure 2:
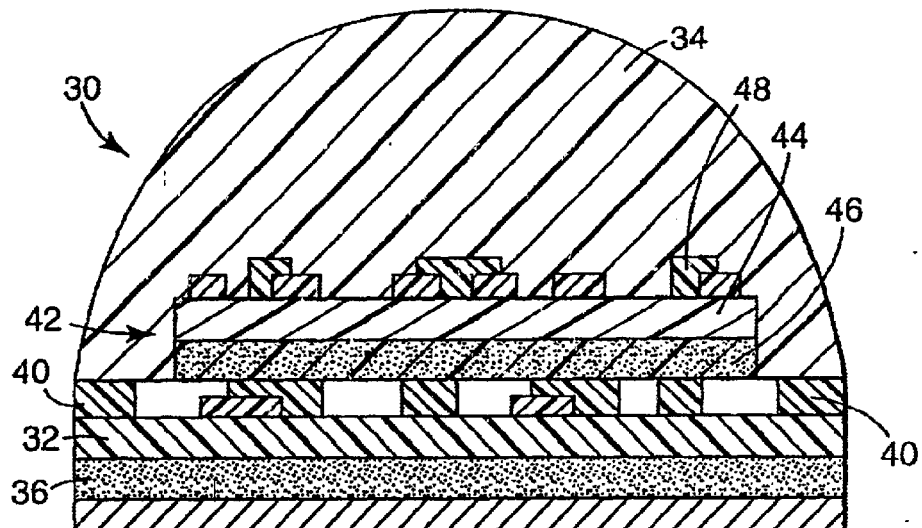
FIG. 2 is a cross-sectional view of another article formed utilizing the polyurethane of the present invention.

Another embodiment of the present invention is depicted in FIG. 2. FIG. 2 generally includes an article 30 having a base substrate 32 and a polyurethane top coat 34 applied over the substrate. Affixed to the substrate 32 is an adhesive 36. A removable release liner 38 is attached to the adhesive. A first layer of indicia 40 is applied to a surface of the substrate 32. A second article containing indicia 42 is then applied over the first layer of indicia 40. The second article 42 includes a substrate 44, an adhesive 46, and indicia 48 applied to the substrate 44 opposite the adhesive 46. The polyurethane top coat 34 of the present invention is applied over the base substrate 32 and the second article 42.

Figure 3:
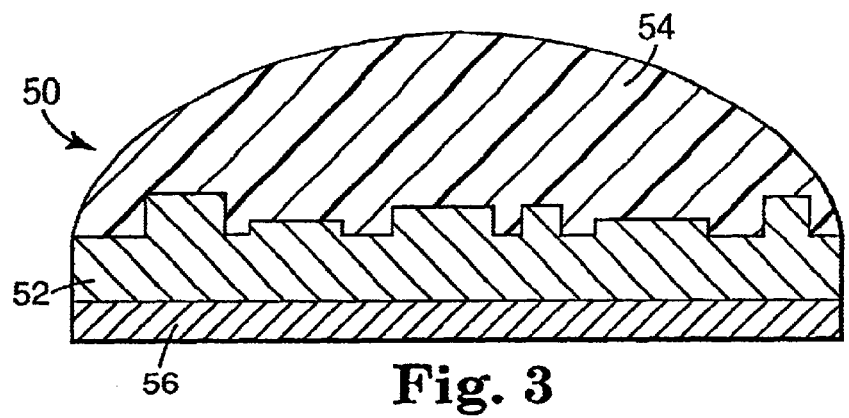
FIG. 3 is a cross-sectional view of an article using a three-dimensional substrate and the polyurethane of the present invention.

FIG. 3 illustrates another embodiment of the present invention. The article 50 includes a three dimensional substrate 52. A polyurethane top coat 54 is applied over the three dimensional substrate 52. A release liner 56 is applied to a surface of the substrate opposite the polyurethane top coat 54.

The following non-limiting examples further illustrate the present invention. Unless otherwise indicated, the following test procedures were used in the examples. The particular materials and amounts recited in these examples, as well as other conditions and details, are to be interpreted broadly in the art and should not be construed to unduly restrict or limit the invention in any way.

Test Methods

Hoffmnan Scratch and Mar Resistance Test:

The scratch and mar of the polyurethanes were measured by a Balanced-Beam Scrape tester described in ASTM-2197-86. The Hoffman stylus was held at 45 degrees from vertical with the top sloping in the direction of test sample travel. The stylus was held in place by a fulcrum elevated at 22 degrees. A 1000-Gram-weight was placed on the weight support. The beam was lowered until the loop rested on top of the test specimen, following which the sliding platform was slowly pushed across the specimen. The scratch test was performed at 25° C. A successful test will result in the polyurethane coat showing no permanent injury, scratch, or defect after 1 hour.

Humidity Resistance:

The polyurethanes were applied over a tin vapor coated polyester film and cured. Each sample was placed in a humidity condensing chamber with 100% relative humidity at 38° C. for 7 days. The samples were observed for cloudiness and corrosion upon removal from the chamber.

Heat Aging:

The polyurethanes were applied onto a white ink printed standard tin coated polyester substrate and cured. The samples were put in an 80° C. oven for 7 days. Upon removal, the polyurethane coat was observed to determine any significant yellowing in color. The color difference or change was measured by standard test ASTM D2244-79. The color difference (Delta E) was calculated by the CIE 1976 L* a* b* Uniform Color Space and Color-Difference Equation For successful results, the value of Delta E shall not exceed 1.

Salt Spray:

The polyurethanes were applied onto a tin coated polyester substrate and cured. The samples were put into a salt spray chamber, which had 5% NaCl solution atomized at 35° C. Upon removal after 10 days, the samples were observed for cloudiness and corrosion.

Shore A Hardness:

Shore A Hardness was measured by Shore A Durometer according to ASTM D-2240.

Thermal Shock:

The polyurethanes were applied onto tin coated polyester and cured. Each sample was tested at 10 cycles of the following tests:

4 Hours at −30° C.

5 minutes immersion at 85° C. water.

The samples were observed for cloudiness and corrosion.

Storage Modulus Test:

The E' (storage modulus) is a measure of flexibility of a material. The storage modulus was measured at 25° C. in tension using Rheometric Solids Analyzer (RSA II) at a frequency of 6.28 rad/second. The tension was kept at 0.03% strain. The test sample, at a thickness of 1.8 mm and ranging in size from 3.5 mm to 6.5 mm, was mounted with clamps and tightened. In oscillatory flow, a periodic strain of predetermined amplitude and frequency is applied to the sample, and the stress response of the material is measured. The real part of the Fourier transform of the response gives the elastic modulus, E' (storage modulus).

Flexural Modulus Test:

The flexural modulus was measured at 25° C. using Seiko DMS 110 at a frequency of 6.28 rad/second. A strip of sample, having a thickness of 1.8 mm and ranging from 10 mm to 13 mm in width and 20 mm in length, was mounted in the dual cantilever fixture. A strain amplitude of 30 microns was used to determine the flexural modulus of the sample.

Substrates utilized in the Examples:

Substrate (1) was prepared by screen printing a Scotchcal™ 7900 Series solvent-based phosphorescent ink using a 110 mesh screen on Scotchlite™ Reflective Engineering Sheeting both supplied from the Minnesota Mining and Manufacturing Company of St. Paul Minn. The ink was dried for 30 minutes at 80° C. Substrates (2)–(4) were standard Scotchcal™ p-series films from the Minnesota Mining and Manufacturing Company. Substrate (5) was prepared by digitally printing a standard powder toner onto a white PVC film. Substrate (6) was made by rotary printing Scotchcal™ 7900 Series solvent-based black metallic ink with carbon fiber pattern on silver PVC film. Substrate (7) was made by applying die-cut PVC graphics onto a hologram polyester film substrate. Substrate (8) was an uncleared and uncut standard 3-Dimensional Graphics from the Minnesota Mining and Manufacturing Co. Substrate (9) was made by applying uncleared/laser cut 3-Dimensional Graphics on PVC woodgrain film. Substrate (10) was prepared by screening Scotchcal™ 7900 Series solvent-based white ink with 230 mesh screen on tin metallized film Substrate (11) was tin metallize film.

EXAMPLE 1

The first component, which was polyester polyols/diols based, was prepared by mixing 31.9 grams of Formrez-55-225, 30 grams of Formrez-55-112, and 30 grams of Tone-301 in a round bottom flask and heated to 70° C. The admixture was agitated and de-gassed for 4 hours by vacuum (below about 30 inch Hg) until all the bubbles were stripped off. The temperature of the admixture was cooled down to about 50° C. and 0.06 grams of T-12, 0.2 grams Silwet L-7607, 1.5 grams of Uvinul N-539 and 1 gram of Tinuvin-292 were then added into the admixture. The admixture was agitated for 15 minutes. The formulation of the first reaction component, by weight percent, is listed in Table 2.

The second reaction component included 100 grams of polyisocyanate (Desmodur XP-7100). The first and second reaction components were mixed in a one to one volume ratio and poured on the above noted eleven substrates. The polyurethanes were cured 10 hours at 52° C. in a convection oven. The cured polyurethane did not outgas on any of the substrates and had excellent optical clarity and flexibility.

Comparative Examples 1–4

The first component in comparative Examples 1 through 4 includes different polyether based polyols and diols. The Examples were prepared according to the same procedure described in Example 1. The polyols and diols utilized for each Example are noted in Table 1.

The second component for Comparative Example 1 was prepared by reacting 30 grams of Pluracol TP-4040 and 70 grams of Desmodur W for 4 hours at 80° C. The resulting second component was a mixture of a secondary polyisocyanate and monomeric isocyanate (Desmodur W). The second component used in Comparative Example 2 was prepared by reacting 73.5 grams of Desmodur I, with 23.5 grams of Desmophen L951, and 3 grams of Multranol-4011 for 4 hours at 80° C. The resulting Part B comprises a mixture of polyisocyanate with primary and secondary isocyanate functional groups and monomeric Desmodur I.

The polyurethanes were prepared by mixing the first and second reaction components in a one to one volume ratio and then poured onto the noted substrates (1) to (11). The polyurethanes were cured 10 hours at 52° C. The polyurethanes in Comparative Examples 1, 2 and 4 were still tacky when cured one hour at 52° C. convection oven or 10 minutes in IR oven and they had severe outgas on substrates (1) to (9). The polyurethanes were very rigid. The polyurethane in Comparative Example 3 was cloudy.

Examples 2–6

The first components used in Examples 2–6 were prepared according to the same procedure described in Example 1. The composition of the first component for each Example is listed in Table 1.

The second component used in Example 2 was prepared by reacting 30 grams of Pluracol-538, and 70 grams of Vestanat IPDI for 4 hours at 80° C. The resulting second component included a mixture of polyisocyanate with primary and secondary isocyanate groups and monomeric Vestanat IPDI. The second component used in Example 3 was the same as the one utilized in Comparative Example 1. The second component in Example 3 comprises a mixture of second polyisocyanate and monomeric Desmodur W. The second component used in Example 4 was prepared by mixing 70 grams of polyisocyanate and 30 of Desmodur H. The second component used in Example 5 was prepared by mixing 50 grams of polyisocyanate and 50 g Desmodur H.

The polyurethanes were prepared by mixing the first component and the second component in a one to one volume ratio and then applied to substrates (1) through (11). The polyurethanes were cured for 10 hours at 52° C. The polyurethanes in Examples 2 and 3 showed severe outgas on substrates (1) through (9). Although not indicated in the Table, the weathering properties of the Examples 2 and 3 are improved over conventional polyurethanes. Additionally, Examples 2 and 3 were rigid. The flexible polyurethane in Examples 4 and 6 were clear and did not exhibit any outgassing on any of the substrates. The polyurethane in Example 5 exhibited outgassing on substrates (1), (5) and (9).

Comparative Examples 5–8 and Examples 7–12

The polyester polyol/diol based first components in Examples 5 through 12 were prepared according to the same procedure described in Examples 1. The ingredients and amounts used for each Example are summarized in Table 4. The type of catalyst was varied for each Example. The various catalysts indicated in the Table.

The polyurethanes were prepared by mixing the first and second reaction components in a one to one volume ratio and then poured onto substrates (1) through (9). The polyurethanes were cured for 10 hours at 52° C. The polyurethane in Examples 7, 9, 10 and 12 didn't outgas and were flexible and optically clear. Comparative Examples 7 and 8 showed severe outgassing on all the substrates tested.

Examples 13–18

The first components utilized in Examples 13–17 were prepared according to the same procedure described in Example 1. The ingredients were varied in order to demonstrate the effect of varying polyether contents on the cured polyurethane. The ingredients and amounts utilized are summarized in Table 5. Additionally, Example 18 included a black pigment added to the first reaction component.

The second component in Example 16 was the same as the one used in Comparative Example 2. The second component in Example 17 was the same one utilized in Comparative Example 1. Examples 13 through 15 and 18 utilized a polyisocyanate. The amount of the second component used in each Example is listed in Table 5.

The polyurethanes for Examples 13–17 were prepared by mixing the first and second components in a one to one volume ratio and then poured onto substrates (1) through (11). The polyurethanes were cured for 10 hours at 52° C. The black pigmented polyurethane in Example 18 was only cast onto substrate (4), a black PVC film. The polyurethane in Example 18 was cured the same way as described in Examples 13–17. The polyurethane in Example 13 was cloudy and therefore unacceptable. The polyurethane in Examples 14 and 15 did not outgas and were clear and flexible. The polyurethanes in Examples 15 and 16 exhibited outgassing on all the substrates tested. Both the Examples were rigid. The pigmented polyurethane in Example 18 was flexible and did not exhibit any outgassing.

TABLE 1

Materials Used in The Invention.

| Designation | Description | Supplier |
|---|---|---|
| Formrez ™-55-225 | Polyester diol (—OH, Eq Wt = 245) | Witco Chemical, Tarrytown, N.Y. |
| Formrez ™-55-112 | Polyester diol (—OH, Eq Wt = 500) | Witco Chemical, Tarrytown, N.Y. |
| Tone ™-301 | Caprolactone-based polyester triol (—OH, Eq Wt = 100) | Union Carbide, Danbury, CT |
| Tone ™-305 | Caprolactone-based polyester triol (—OH, Eq Wt = 180) | Union Carbide, Danbury, CT |
| Pluracol ™ 538 | Poly(propylene oxide) based triol (—OH, Eq Wt = 1603) | BASF, Mount Oliver, N.J. |
| Pluracol ™ TP-4040 | Poly(propylene oxide) based triol (—OH, Eq Wt = 1368) | BASF, Mount Oliver, N.J. |
| Pluracol ™-220 | Poly(propylene oxide) based triol (—OH, Eq Wt = 2078) | BASF, Mount Oliver, N.J. |
| Multranol-4011 | Poly(oxyalkylene) ether (Eq Wt = 100) | Bayer Corp, Pittsburgh, PA |
| Desmophen L951 | Poly(oxyalkylene) ether (Eq Wt = 213) | Bayer Corp, Pittsburgh, PA |
| Vestanat ™ IPDI | Isophorone diisocyanate | HULS America Inc., Piscataway, N.J. |
| Desmodur ™ I | Isophorone diisocyanate | Bayer Corp, Pittsburgh, PA |
| Desmodur ™ W | Bis(4-isocyanatocyclohexyl) methane (Eq Wt = 132) | Bayer Corp, Pittsburgh, PA |
| Tolanate ™ HDT-LV | Polyisocycanate (Eq Wt = 183) | Rhodia, Inc., Teaneck, N.J. |
| Desmodur ™ H | 1,6-hexamethylene diisocyanate (—NCO, Eq Wt = 84) | Bayer Corp, Pittsburgh, PA |
| Desmodur ™ XP-7100 | Polyisocyanate (Eq Wt = 205) | Bayer Corp, Pittsburgh, PA |
| Metacure ™T-12 | Dibutyl tin dilaurate | Air Products and Chemicals, Allentown, PA |
| Metacure ™T-9 | Stannous octoate | Air Products and Chemicals, Allentown, PA |
| Cotin ™-222 | Tin carboxylate | Caschem, Carlstadt, N.J. |
| Cotin ™-430 | Diocyltin dicarboxylate | Caschem, Carlstadt, N.J. |
| Formrez ™ SUL-3 | Dibutyl tin diacetate | Witco Chemical, Tarrytown, N.Y. |

TABLE 1-continued

Materials Used in The Invention.

| Designation | Description | Supplier |
|---|---|---|
| Formrez ™ UL-22 | Dibutyl tin dimercaptide | Witco Chemical, Tarrytown, N.Y. |
| Formrez ™ UL-29 | Dimethyl tin dimercaptide | Witco Chemical, Tarrytown, N.Y. |
| Octoate Z | Zinc ethyloctoate | Vanderbilt, Norwalk, CT |
| K-Kat ®-8201 | Dibutyl tin bis(acetylacetonate) | King Industries, Norwalk, CT |
| Uvinul ™ N-539 | UV-Light Absorber | BASF, Parsippany, N.J. |
| Tinuvin ™-292 | Hindered Amine | Ciba-Geigy, Hawthorne, N.Y. |
| Irgarol ™-1051 | Fungicide | Ciba-Geigy, Hawthorne, N.Y. |
| Skane M-8 | Fungicide | Rhom and Haas, edison, N.J. |
| Silwet ™ L-7607 | Polyethylene Oxide Modified Polymethyl siloxane | Witco Chemical, Tarrytown, N.Y. |
| Silwet ™ L-77 | Polyethylene Oxide Modified Polymethyl siloxane | Witco Chemical, Tarrytown, N.Y. |
| Zapon ™ Black R Liquid | Water-Based Jet Black Dye | BASF, Rensselaer, N.Y. |
| Scotchlite ™ Engineering Grade Reflective Sheeting | Reflective Substrate with Pressure Sensitive Adhesive | 3M, St. Paul, MN |
| 3-Dimensional Graphics | 3 Dimensional Graphics with Pressure Sensitive Adhesive | 3M, St. Paul, MN |

TABLE 2

Polyether based Polyurethanes Cured on Various Substrates.

| 1$^{st}$ component (grams) | Comp. Exp. 1 | Comp. Exp. 2 | Comp. Exp. 3 | Comp. Exp. 4 |
|---|---|---|---|---|
| Pluracol-200 | — | 40.0 | — | — |
| Multranol-4011 | 35.0 | 38.8 | 35.0 | 35.0 |
| Pluracol 538 | 36.8 | — | 36.8 | 36.8 |
| Desmophen L951 | 27.7 | 21.3 | 27.7 | 27.7 |
| T-12 | 0.06 | 0.06 | 0.06 | 0.06 |
| Uvinul N-539 | 1.0 | 1.0 | 1.0 | 1.0 |
| Tinuvin-292 | 1.0 | 1.0 | 1.0 | 1.0 |
| Silwet L-7607 | 0.3 | 0.3 | 0.3 | 0.3 |
| Silwet L-77 | — | — | — | — |
| 2$^{nd}$ component: 30 grams Pluracol TP-4040 + 70 grams Desmodur W | 100.0 | — | — | — |
| 2$^{nd}$ component: 73.5 grams Desmodur I + 23.5 grams of Desmophen L951 + 3 grams Multranol-4011 | — | 100.0 | — | 100.0 |
| 2$^{nd}$ component: Desmodur XP-7100 | — | — | 100.0 | — |
| X-link density (%) | 50.9% | 52.6% | 85.9% | 49.1% |
| (wt %) Polyether polyols/diols in urethane top coat | 65% | 63.3% | 50% | 63.3% |
| Isocyanate used | 2° | 1° & 2° | 1° | 1° & 2° |
| Clarity of urethane top coat | Clear | Clear | Milky | Clear |
| Flexibility of urethane top coat | Rigid | Rigid | White — | Rigid |
| (1) Cured on phosphorescent ink | Outgas | Outgas | — | Outgas |
| (2) Cured on blue pearl PVC film (P-5338) | Outgas | Outgas | — | Outgas |
| (3) Cured on woodgrain PVC. | Outgas | Outgas | — | Outgas |
| (4) Cured on black PVC film (P-3098) | Outgas | Outgas | — | Outgas |
| (5) Cured on 3M digital printed graphics on white PVC film | Outgas | Outgas | — | Outgas |
| (6) Cured on 3M inks printed graphics on silver PVC film (P-3450) | Outgas | Outgas | — | Outgas |
| (7) Cured on PVC graphics on hologram polyester | Outgas | Outgas | — | Outgas |
| (8) Cured on uncleared/uncut 3-dimensional graphics. | Outgas | Outgas | — | Outgas |
| (9) Cured on 3-dimensional graphics on woodgrain PVC | Outgas | Outgas | — | Outgas |
| (10) White ink printed standard tin coated polyester substrate. | OK | OK | — | OK |
| (11) Tin coated polyester substrate | OK | OK | — | OK |

TABLE 3

Polyether-Based Polyurethanes Cured on Various Substrates.

| 1$^{st}$ component (grams) | Exp. 1 | Exp. 2 | Exp. 3 | Exp. 4 | Exp. 5 | Exp. 6 |
|---|---|---|---|---|---|---|
| Formrez-55-225 | 31.9 | 30.6 | 30.6 | 31.9 | 31.9 | 36.8 |
| Formrez-55-112 | 30.0 | 30.5 | 30.5 | 30.0 | 30.0 | — |
| Tone-305 | — | 26.1 | 26.1 | — | — | 59.8 |
| Tone-301 | 30.0 | — | — | 30.0 | 30.0 | — |
| T-12 | 0.06 | 0.06 | 0.06 | 0.06 | 0.06 | 0.045 |
| Uvinul N-539 | 1.5 | 1.4 | 1.4 | 1.5 | 1.5 | 1.5 |
| Tinuvin-292 | 1.0 | 1.4 | 1.4 | 1.0 | 1.0 | 1.0 |
| Irgarol-1051 | — | — | — | — | — | 0.8 |
| Skane M-8 | — | — | — | — | — | 0.5 |
| Silwet L-7607 | 0.2 | — | — | 0.5 | 0.5 | 0.3 |
| Silwet L-77 | — | 0.15 | 0.15 | — | — | — |
| 2$^{nd}$ component: 30 grams Pluracol TP-4040 + 70 grams Desmodur W | — | — | 100 | — | — | — |

TABLE 3-continued

Polyether-Based Polyurethanes Cured on Various Substrates.

| 1st component (grams) | Exp. 1 | Exp. 2 | Exp. 3 | Exp. 4 | Exp. 5 | Exp. 6 |
|---|---|---|---|---|---|---|
| 2nd component: 70 grams Vestanat IPDI + 30 grams Pluracol-538 | — | 100.0 | — | — | — | — |
| 2nd component: Desmodur XP-7100 | 100.0 | — | — | — | — | — |
| 2nd component: Tolanate HDT-LV | — | — | — | — | — | 100.0 |
| 2nd component: Desmodur XP-7100/Desmodur H = 70/30 by weight | — | — | — | 75.0 | — | — |
| 2nd component: Desmodur XP-7100/Desmodur H = 50/50 by weight | — | — | — | — | 62.0 | — |
| X-link density (%) | 65% | 26.3% | 28.0% | 41.2% | 30% | 79.9% |
| Isocyanate used | 1° | 1° & 2° | 2° | 1° | 1° | 1° |
| Clarity of urethane top coat | Clear | Clear | Clear | Clear | Clear | Clear |
| Flexibility of urethane top coat | Flexible | Rigid | Rigid | Flexible | Flexible | Flexible |
| (1) Cured on phosphorescent ink | OK | Outgas | Outgas | OK | Outgas | OK |
| (2) Cured on blue pearl PVC (P-5338) | OK | Outgas | Outgas | OK | OK | OK |
| (3) Cured on woodgrain PVC film | OK | Outgas | Outgas | OK | OK | OK |
| (4) Cured on black PVC film (P-3098) | OK | Outgas | Outgas | OK | OK | OK |
| (5) Cured on 3M digital printed graphics on white PVC film | OK | Outgas | Outgas | OK | Outgas | OK |
| (6) Cured on 3M inks printed graphics on silver PVC film (P-3450) | OK | Outgas | Outgas | OK | OK | OK |
| (7) Cured on PVC graphics on hologram polyester substrate | OK | Outgas | Outgas | OK | OK | OK |
| (8) Cured on uncleared/uncut 3-dimensional graphics. | OK | Outgas | Outgas | OK | OK | OK |
| (9) Cured on 3-dimensional graphics on woodgrain PVC film | OK | Outgas | Outgas | OK | Outgas | OK |
| (10) White ink printed standard tin coated polyester substrate. | OK | OK | OK | — | — | OK |
| (11) Tin coated polyester substrate | OK | OK | OK | — | — | OK |

TABLE 4

Polyurethanes Made from Polyester Polyols/Diols Comprising Different Catalysts in the First Component and Cured on Various Substrates.

| 1st component (grams) | Comp. Exp. 5 | Exp. 7 | Exp. 8 | Exp. 9 | Exp. 10 | Exp. 11 | Comp. Exp. 6 | Comp. Exp. 7 | Comp. Exp. 8 | Exp. 12 |
|---|---|---|---|---|---|---|---|---|---|---|
| Formrez-55-225 | 31.9 | 31.9 | 31.9 | 31.9 | 31.9 | 31.9 | 31.9 | 31.9 | 31.9 | 31.9 |
| Formrez-55-112 | 30.0 | 30.0 | 30.0 | 30.0 | 30.0 | 30.0 | 30.0 | 30.0 | 30.0 | 30.0 |
| Tone-301 | 30.0 | 30.0 | 30.0 | 30.0 | 30.0 | 30.0 | 30.0 | 30.0 | 30.0 | 30.0 |
| 1. Metacure T-9 | 0.06 | — | — | — | — | — | — | — | — | — |
| 2. Cotin-222 | — | 0.06 | — | — | — | — | — | — | — | — |
| 3. Cotin 430 | — | — | 0.06 | — | — | — | — | — | — | — |
| 4. Formrez SUL-3 | — | — | — | 0.06 | — | — | — | — | — | — |
| 5. Formrez UL-22 | — | — | — | — | 0.06 | — | — | — | — | — |
| 6. Formrez UL-29 | — | — | — | — | — | 0.06 | — | — | — | — |
| 7. Bismuth Neodecanoate, 20% | — | — | — | — | — | — | 0.35 | — | — | — |
| 8. Zinc Neodecanoate, 16% | — | — | — | — | — | — | — | 0.44 | — | — |
| 9. Octoate Z | — | — | — | — | — | — | — | — | 0.5 | — |
| 10. K-Kat-8201 | — | — | — | — | — | — | — | — | — | 0.06 |
| Uvinul N-539 | 1.5 | 1.5 | 1.5 | 1.5 | 1.5 | 1.5 | 1.5 | 1.5 | 1.5 | 1.5 |
| Tinuvin-292 | 1.0 | 1.0 | 1.0 | 1.0 | 1.0 | 1.0 | 1.0 | 1.0 | 1.0 | 1.0 |
| Silwet L-7607 | 0.3 | 0.3 | 0.3 | 0.3 | 0.3 | 0.3 | 0.3 | 0.3 | 0.3 | 0.3 |
| 2nd component: Desmodur XP-7100 | 100 | 100 | 100 | 100 | 100 | 100 | 100 | 100 | 100 | 100 |
| (1) Cured on phosphorescent ink | Severe Outgas | OK | OK | OK | OK | Outgas | Outgas | Severe Outgas | Severe Outgas | OK |
| (2) Cured on blue pearl PVC film (P-5338) | OK | OK | OK | OK | OK | OK | OK | Severe Outgas | Severe Outgas | OK |
| (3) Cured on woodgrain PVC film | OK | OK | OK | OK | OK | OK | OK | Severe Outgas | Severe Outgas | OK |
| (4) Cured on black PVC film (P-3098) | OK | OK | OK | OK | OK | OK | Outgas | Severe Outgas | Severe Outgas | OK |

TABLE 4-continued

Polyurethanes Made from Polyester Polyols/Diols Comprising Different Catalysts in the First Component and Cured on Various Substrates.

| 1st component (grams) | Comp. Exp. 5 | Exp. 7 | Exp. 8 | Exp. 9 | Exp. 10 | Exp. 11 | Comp. Exp. 6 | Comp. Exp. 7 | Comp. Exp. 8 | Exp. 12 |
|---|---|---|---|---|---|---|---|---|---|---|
| (5) Cured on 3M digital printed graphics on white PVC film | Outgas | OK | Outgas | OK | OK | Outgas | OK | Severe Outgas | Severe Outgas | OK |
| (6) Cured on 3M inks printed graphics on silver PVC film (P-3450) | OK | OK | OK | OK | OK | OK | OK | Severe Outgas | Severe Outgas | OK |
| (7) Cured on PVC graphics on hologram polyester | Outgas | OK | OK | OK | OK | OK | OK | Severe Outgas | Severe Outgas | OK |
| (8) Cured on uncleared/uncut 3-dimensional graphic | OK | OK | OK | OK | OK | OK | OK | Severe Outgas | Severe Outgas | OK |
| (9) Cured on 3-dimensional graphics on woodgrain PVC film | OK | OK | OK | OK | OK | OK | OK | Severe Outgas | Severe Outgas | OK |

TABLE 5

Clarity of Polyurethanes Made from a Mixture of Polyester/Polyether Polyols/Diols in the First Component and Cured by Primary and Secondary Polyisocyanates.

| 1st component (grams) | Exp. 13 | Exp. 14 | Exp. 15 | Exp. 16 | Exp. 17 | Exp. 18 |
|---|---|---|---|---|---|---|
| Tone-301 | 20.3 | 25.0 | 25.0 | 20.3 | 20.3 | 30.0 |
| Pluracol-538 | — | — | — | — | — | — |
| Formrez-55-225 | — | — | — | — | — | 31.9 |
| Voranol 230-660 | — | — | — | — | — | — |
| Formrez-55-112 | — | — | — | — | — | 30.0 |
| Desmophen L-951 | 49.4 | 30.0 | 33.0 | 49.4 | 49.4 | — |
| Formrez-33-112 | 29.5 | 43.0 | — | 29.5 | 29.5 | — |
| Zapon black R liquid | — | — | — | — | — | 1.5 |
| Formrez-8056-143 | — | — | 41.2 | — | — | — |
| Multranol-4011 | — | — | — | — | — | 35.0 |
| T-12 | 0.06 | 0.06 | 0.06 | 0.06 | 0.06 | 0.07 |
| Silwet L-7607 | 0.3 | 0.4 | 0.4 | 0.3 | 0.3 | 0.30 |
| Uvinul N-539 | 0.4 | 0.3 | 0.2 | 0.4 | 0.4 | 1.5 |
| Tinuvin-292 | — | 0.2 | 0.2 | — | — | 1.5 |
| 2nd component: 73.5 grams Desmodur I + Grams Desmophen L951 + 3 grams Multranol-4011 | — | — | — | 100 | — | — |
| 2nd component: 30 grams Pluracol TP-4040 + 70 grams Desmodur W | — | — | — | — | 100 | — |
| 2nd component: Desmodur XP-7100 | 100 | 100 | 100 | — | — | 100 |
| Isocyanate used | 1° | 1° | 1° | 1° & 2° | 2° | 1° |
| X-lik density (%) | 60.1% | 62.5% | 62.5% | 23.4% | 25.1% | 62.5% |
| (wt %) of Polyether polyols/diols in urethane top coat | 24.9% | 15.0% | 16.5% | 52.7% | 54.4% | 64.2% |
| Clarity of urethane top coat | Milky White | Clear | Clear | Clear | Clear | Clear |
| Flexibility of urethane top coat | — | Flexible | Flexible | Rigid | Rigid | Flexible |
| (1) Cured on phosphorescent ink. | — | OK | OK | Outgas | Outgas | — |
| (2) Cured on blue pearl PVC (P-5338). | — | OK | OK | Outgas | Outgas | — |
| (3) Cured on woodgrain PVC film. | — | OK | OK | Outgas | Outgas | — |
| (4) Cured on black PVC (P-3098). | — | OK | OK | Outgas | Outgas | OK |
| (5) Cured on 3M digital printed graphics on white PVC film. | — | OK | OK | Outgas | Outgas | — |
| (6) Cured on 3M inks printed graphics on silver PVC (P-3450). | — | OK | OK | Outgas | Outgas | — |
| (7) Cured on PVC graphics applied on hologram polyester film. | — | OK | OK | Outgas | Outgas | — |
| (8) Cured on uncleared/uncut 3-dimensional graphics. | — | OK | OK | Outgas | Outgas | — |
| (9) Cured on 3-dimensional graphics on woodgrain PVC film. | — | OK | OK | Outgas | Outgas | — |
| (10) White ink printed standard tin coated polyester substrate. | — | OK | OK | OK | OK | — |
| (11) Standard tin coated polyester. | — | OK | OK | OK | OK | — |

TABLE 6

Specification Test Results

| Examples | Comp. Exp. 1 | Comp. Exp. 2 | Exp. 13 | Exp. 14 | Comp. Exp. 4 | Exp. 1 | Exp. 6 |
|---|---|---|---|---|---|---|---|
| Type of Polyols/Diols in Part A | Polyether | Polyether | Polyester/polyether | Polyester/polyether | polyether | polyester | polyester |
| Flexibility (Shore A Hardness) | 94 | 98 | 81 | 81 | 97 | 84 | 89 |
| Storage Modulus (Pascal) | — | $6.1 \times 10^8$ | $1.3 \times 10^7$ | $1.4 \times 10^7$ | $4.5 \times 10^8$ | $1.5 \times 10^7$ | — |
| Flexural Modulus (Pascal) | — | $9.5 \times 10^8$ | $2.8 \times 10^7$ | $2.2 \times 10^7$ | $7.2 \times 10^8$ | $2.7 \times 10^7$ | — |
| Hoffman scratch test: (1 kg. Weight load). (from a scale 1 to 5) | Scratched (4) | Scratched (5) | OK (1) | OK (2) | Scratched (4) | OK (1) | OK (1) |
| Color shift (DE*): Heat age 7 days @ 80° C. | 2.23 | 1.13 | 1.06 | 1.17 | 2.04 | 0.72 | 0.77 |
| Salt spray: 10 days, 5% NaCl (DIN50021) | Clear | Slightly Cloudy | Clear | Clear | Clear | Clear | Clear |
| Humidity resistance: 7 days @ 38° C., 100% R.H. | Clear | Clear | Cloudy | Cloudy | Clear | Clear | Clear |
| Thermal Shock: | Clear | Slightly Cloudy | Slightly Cloudy | Slightly Cloudy | Clear | Clear | Clear |

Discussion of Examples and Tables 2–6

Tables 2 and 3 illustrate the impact of primary and secondary isocyanates on the flexibility of the resulting polyurethanes. The Examples utilizing a primary isocyanate resulted in flexible polyurethanes. The Examples utilizing secondary isocyanates, or a combination of primary and secondary isocyanates, result in a rigid polyurethane. Additionally, the Examples indicate that the use of secondary isocyanates results in outgassing in the cured polyurethane. Comparative Example 3 in Table 2 indicates that the use of polyether compounds in an amount of about 50 weight percent resulted in an unclear polyurethane. Additionally, the Tables indicate that the Examples utilizing a primary aliphatic polyisocyanate resulted in flexible polyurethanes with crosslink densities at the same level or higher than the rigid polyurethanes.

Table 4 represents the results of bismuth, tin, and zinc based catalysts on the polyurethane of the present invention. The bismuth and zinc based catalysts resulted in outgassing in the cured polyurethane. The tin based performed much better and only exhibited outgassing on a few types of substrates. The dibutyl tin compounds did not exhibit any outgassing.

The results of the mixed polyether/polyester polyurethanes are listed in Table 5. The results indicate that secondary isocyanates produced rigid polyurethanes. Additionally, the use of secondary isocyanates results in outgassing. Example 13, with a polyether content in excess of 20 weight percent, was milky white. The Examples utilizing a primary polyisocyanate were flexible and did not outgas. Example 18 demonstrated the use of a black pigment in the first reaction component.

Table 6 illustrates flexibility, durability and weather resistant properties of the polyurethanes, The Examples 1,6, 13, and 14 indicate that the polyurethanes produced in accordance with the present invention exhibit improved flexibility and durability properties over the Comparative Examples. The flexibility and durability of the polyurethanes are demonstrated through the Shore A hardness, storage modulus, flexural modulus, and Hoffman scratch tests. Additionally, the polyester based polyurethanes exhibited improved weathering properties as represented through the salt spray, humidity resistance, and thermal shock tests.

In accordance with the provisions of the patent statutes, the present invention has been described in what is considered to represent its preferred embodiment. However, it should be noted that the invention can be practiced otherwise than as specifically illustrated and described without departing from its spirit and scope.

What is claimed is:

1. An article comprising:
    a) a substrate selected from polymeric material, wood, fabric, reinforced polymers, metal, reflective sheeting, and a combination thereof, wherein the polymeric material or the polymer of the reinforced polymer comprises a polyvinyl chloride, polyester, acrylic polymer, polycarbonate, polyurethane, polyethylene acrylic acid copolymer, or polyvinyl acetate; and
    b) a clear polyurethane applied as a protective layer on a first surface of said substrate, said polyurethane is a reaction product of,
        i) a first component comprising one or more polyols having an equivalent weight in the range from about 28 to about 3000, optionally one or more diols having an equivalent weight in the range from about 30 to about 4000, and a catalyst; and
        ii) a second component comprising at least 50 weight percent of a primary polyisocyanate having a functionality of at least three, and wherein the first and second components together are solvent free.

2. An article as recited in claim 1, wherein an adhesive is applied onto a second surface of said substrate opposite to the first surface of said substrate.

3. An article as recited in claim 1, further comprising indicia applied onto the first surface of said substrate and covered by said polyurethane.

4. An article as recited in claim 3, wherein said indicia is three dimensional.

5. An article as recited in claim 3, wherein said polyurethane layer covers all exposed surfaces of the indicia and the first surface of said substrate.

6. An article as recited in claim 4, wherein said three dimensional indicia comprises a cured polyurethane body having a mounting surface, a tie layer bonded to the mounting surface, and an adhesive body adhered to the tie layer.

7. An article as recited in claim 1, wherein said substrate is a base substrate and one or more secondary articles are applied over said base substrate, each of said secondary articles comprising an adhesive attachment system, a substrate, and indicia.

8. An article as recited in claim 7, wherein said base substrate includes indicia and said secondary articles are applied over the indicia of said base substrate.

9. An article as recited in claim 7, wherein said one or more secondary articles include three dimensional articles.

10. An article as recited in claim 1, wherein said catalyst is a tin-based catalyst and said polyurethane, upon exposure to moisture or carboxyl groups, does not exhibit a substantial amount of outgassing.

11. An article as recited in claim 1, wherein the second component further comprises one or more monomeric isocyanates.

12. An article as recited in claim 1, wherein the first and second components form a solvent-free admixture having an NCO:OH ratio of about 0.75 to about 1.25.

13. An article as recited in claim 1, wherein the polyurethane contains up to about 20 weight percent of polyether segments.

14. An article comprising:
  a) a substrate selected from polymeric material, wood, fabric, reinforced polymers, metal, reflective sheeting, and a combination thereof, wherein the polymeric material or the polymer of the reinforced polymer comprises a polyvinyl chloride, polyester, acrylic polymer, polycarbonate, polyurethane, polyethylene acrylic acid copolymer, or polyvinyl acetate; and
  b) a clear protective polyurethane layer on a first surface of the substrate, wherein the polyurethane contains primary aliphatic isocyanate crosslinking, and wherein about 25% or more of the total crosslink density is contributed by a polyisocyanate components, said polyurethane exhibiting at least one property selected from the group consisting of a flexural modulus of 1.0×10$^8$ pascals or less, a storage modulus of 1.0×10$^8$ pascals or less, a Shore A hardness of less than 94, a Hoffman scratch-hardness test result of 2 or less, and a color shift, in accordance with heat aging test ASTM D2244-79, within 1 delta E.

15. An article as recited in claim 14, wherein the polyurethane is a reaction product of:
  (i) a first component comprising one or more polyols having an equivalent weight in the range from about 28 to about 3000, optionally one or more diols having an equivalent weight in the range from about 30 to about 4000, and a catalyst; and
  (ii) a second component comprising at least 50 weight percent of a primary polyisocyanate having a functionality of at least three, and wherein the first and second components together are solvent free.

16. An article as recited in claim 14, further comprising indicia on a portion of the first surface of the substrate, wherein the polyurethane covers all exposed surfaces of the indicia and the first surface of said substrate.

17. An article as recited in claim 14, further comprising an adhesive layer on a second surface of the substrate, wherein the second surface is opposite the first surface of said substrate.

18. An article comprising:
  a) a substrate having a first surface, said substrate selected from polymeric material, wood, fabric, reinforced polymers, metal, reflective sheeting, and a combination thereof, wherein the polymeric material or the polymer of the reinforced polymer comprises a polyvinyl chloride, polyester, acrylic polymer, polycarbonate, polyurethane, polyethylene acrylic acid copolymer, or polyvinyl acetate;
  b) indicia on at least a portion of the first surface of the substrate; and
  c) a clear polyurethane applied as a protective layer over the indicia and any exposed portions of the first surface of said substrate, wherein the polyurethane is a reaction product of:
    i) a first component comprising one or more polyols having an equivalent weight in the range from about 28 to about 3000, optionally one or more diols having an equivalent weight in the range from about 30 to about 4000, and a catalyst; and
    ii) a second component comprising at least 50 weight percent of a primary polyisocyanate having a functionality of at least three, and wherein the first and second components together are solvent free;
  wherein the first and second components form a solvent-free admixture having an NCO:OH ratio of about 0.75 to about 1.25.

19. An article as recited in claim 18, further comprising an adhesive layer on a second surface of the substrate, wherein the second surface is opposite the first surface of said substrate.

20. An article comprising:
  a) a substrate selected from polymeric material, wood, fabric, reinforced polymers, metal, reflective sheeting, and a combination thereof, wherein the polymeric material or the polymer of the reinforced polymer comprises a polyvinyl chloride, polyester, acrylic polymer, polycarbonate, polyurethane, polyethylene acrylic acid copolymer, or polyvinyl acetate; and
  b) a flexible clear polyurethane applied as a layer on a surface of said substrate, said flexible polyurethane comprising a reaction product of,
    i) a first component included one or more polyols having an equivalent weight in the range from about 28 to about 3000, optionally one or more diols having an equivalent weight in the range from about 30 to bout 4000, and a catalyst; and
    ii) a second component comprising a primary aliphatic isocyanate crosslinker having at least 50 weight percent polyisocyanate,
  wherein the first and second components together are solvent free.

21. An article as recited in claim 1, wherein the first component comprises greater than about 20 weight percent polyester.

22. An article as recited in claim 1, wherein the primary polyisocyanate comprises a primary aliphatic polyisocyanate.

23. An article as recited in claim 18, wherein the first component comprises greater than about 20 weight percent polyester.

24. An article as recited in claim 18, wherein the primary polyisocyanate comprises a primary aliphatic polyisocyanate.

25. An article as recited in claim 20, wherein the first component comprises greater than about 20 weight percent polyester.

26. An article as recited in claim 14, wherein the first component comprises greater than about 20 weight percent polyester.

27. An article as recited in claim 1, wherein said clear polyurethane protective layer has a curved outer surface.

28. An article as recited in claim 14, wherein said clear protective polyurethane layer has a curved outer surface.

29. An article as recited in claim 18, wherein said clear polyurethane protective layer has a curved outer surface.

30. An article as recited in claim 20, wherein said clear polyurethane layer has a curved outer surface.

31. The article of claim 1, wherein at least a portion of the substrate is visible through the polyurethane protective layer.

32. The article of claim 14, wherein at least a portion of the substrate is visible through the polyurethane protective layer.

33. The article of claim 18, wherein at least a portion of the substrate is visible through the polyurethane protective layer.

34. The article of claim 20, wherein at least a portion of the substrate is visible through the polyurethane protective layer.

* * * * *

UNITED STATES PATENT AND TRADEMARK OFFICE
CERTIFICATE OF CORRECTION

PATENT NO. : 6,709,748 B1
DATED : March 23, 2004
INVENTOR(S) : Ho, Chia-Tie

It is certified that error appears in the above-identified patent and that said Letters Patent is hereby corrected as shown below:

Title page,
Item [56], References Cited, U.S. PATENT DOCUMENTS, delete "3,915,050" and insert thereof -- 3,916,050 --;

Column 2,
Line 4, delete "polythane", insert in place thereof -- polyurethane --;

Column 4,
Line 50, delete "coal", insert in place thereof -- coat --;

Column 5,
Line 26, delete "polyurethan", insert in place thereof -- polyurethane --;

Column 6,
Line 42, delete "flexbility", insert in place thereof -- flexibility --;
Line 53, delete "utilize", insert in place thereof -- utilized --;

Column 7,
Line 31, delete "substances", insert in place thereof -- substrates --;

Column 10,
Line 6, delete "metallize", insert in place thereof -- metallized --;

Column 11,
Line 5, delete "second", insert in place thereof -- secondary --;

UNITED STATES PATENT AND TRADEMARK OFFICE
CERTIFICATE OF CORRECTION

PATENT NO. : 6,709,748 B1
DATED : March 23, 2004
INVENTOR(S) : Ho, Chia-Tie

It is certified that error appears in the above-identified patent and that said Letters Patent is hereby corrected as shown below:

Column 17,
Table 5, line 19, insert -- 23.5 -- after "I+";

Signed and Sealed this

Twenty-sixth Day of October, 2004

JON W. DUDAS
*Director of the United States Patent and Trademark Office*